Figure 3:
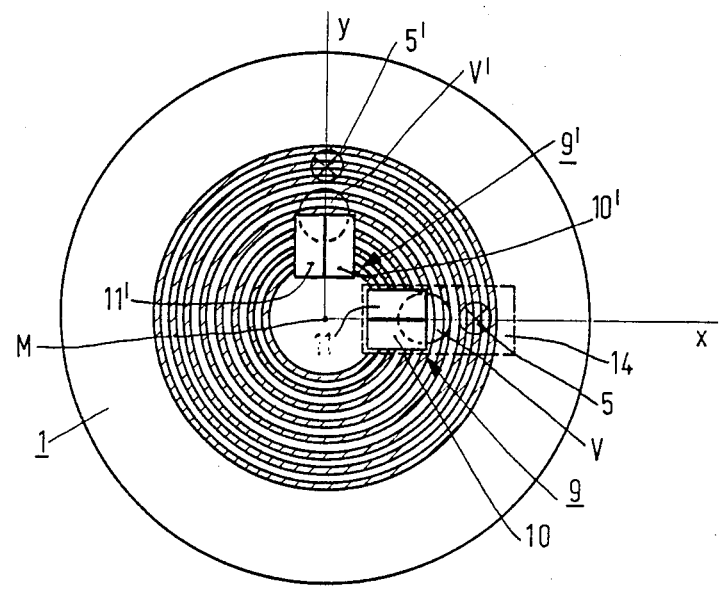

United States Patent [19]
Opheij

[11] Patent Number: 4,761,776
[45] Date of Patent: Aug. 2, 1988

[54] DEVICE FOR DETERMINING A CENTRING ERROR OF AN OPTICAL DISC RELATIVE TO THE AXIS OF ROTATION OF A TURNTABLE SUPPORTING THE DISC

[75] Inventor: Willem G. Opheij, Eindhoven, Netherlands

[73] Assignee: U.S. Philips Corporation, New York, N.Y.

[21] Appl. No.: 833,922

[22] Filed: Feb. 27, 1986

[30] Foreign Application Priority Data

Dec. 11, 1985 [NL] Netherlands ............ 8503411

[51] Int. Cl.⁴ .................................. G11B 7/26
[52] U.S. Cl. ............................ 369/54; 369/58
[58] Field of Search .............. 369/54, 58, 44, 46

[56] References Cited

U.S. PATENT DOCUMENTS

| Re. 30,723 | 8/1981 | Heine | 369/44 |
| 3,915,576 | 10/1975 | Taylor | 369/58 |
| 4,030,835 | 6/1977 | Firester et al. | 369/54 |
| 4,155,098 | 5/1979 | Roach et al. | 369/54 |
| 4,180,830 | 12/1979 | Roach | 369/54 |
| 4,363,118 | 12/1982 | Roach et al. | 369/54 |

FOREIGN PATENT DOCUMENTS

| 57-103109 | 6/1982 | Japan | 369/54 |
| 57-103110 | 6/1982 | Japan | 369/54 |

Primary Examiner—Raymond F. Cardillo
Assistant Examiner—James E. Tomassini
Attorney, Agent, or Firm—Algy Tamoshunas

[57] ABSTRACT

A device is described for determining a centring error of a track-shaped information structure in an optical record carrier relative to an axis of rotation of a turntable. The device comprises at least one radiation source and at least one radiation-sensitive detection system with at least two detectors. The output signals of the detectors provide an indication of the direction in which the radiation from the radiation source which is diffracted in a first radial order b(−1) by the information structure. This in turn gives an indication of the position of the center of the track structure. This device enables optical record carriers without center hole to be used.

15 Claims, 6 Drawing Sheets

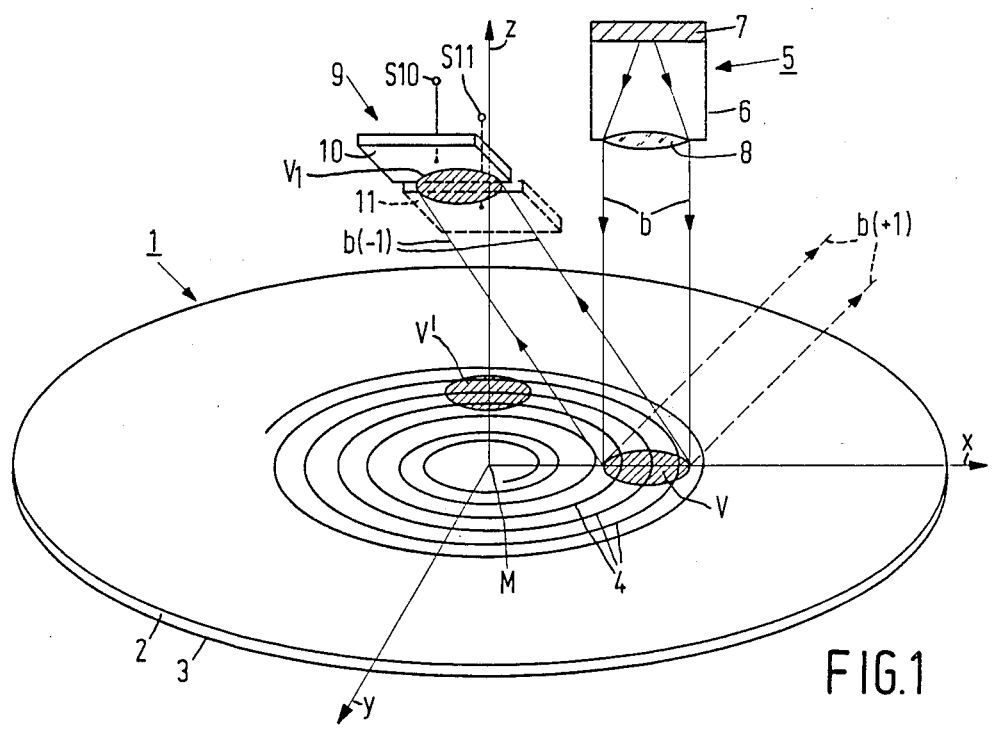
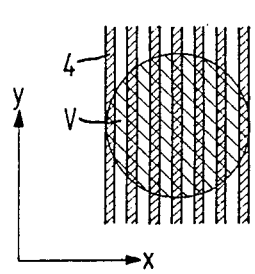 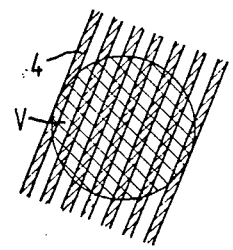 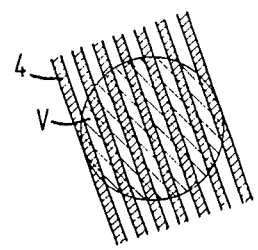
FIG.2a     FIG.2b     FIG.2c
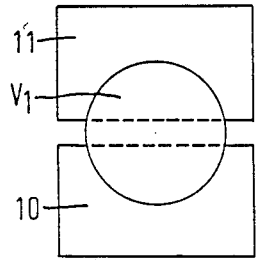 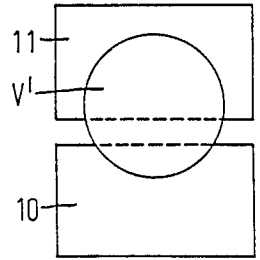 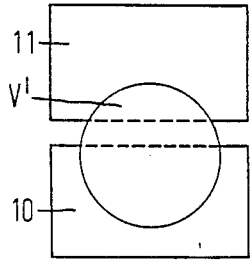
FIG.2d     FIG.2e     FIG.2f

DEVICE FOR DETERMINING A CENTRING ERROR OF AN OPTICAL DISC RELATIVE TO THE AXIS OF ROTATION OF A TURNTABLE SUPPORTING THE DISC

The invention relates to a device for determining the centering error of a round track-shaped information structure in an optical record carrier relative to the axis of rotation of a turntable supporting the record carrier. Such a device comprises at least one radiation source for projecting radiation onto the information structure and a radiation-sensitive detection system for converting radiation originating from the record carrier into an electric signal which is indicative of the centering error. The invention also relates to an apparatus for scanning the record carrier with an optical radiation beam in order to read and/or record information in the record carrier, and to a novel type of record carrier which can be put to practical use owing to the novel centering-error detection device and the associated positioning means for positioning the center of the track structure relative to the axis of rotation of the turntable.

The information structure comprises a multitude of adjacent concentric circular tracks of a multitude of quasi-concentric continuous circular tracks which form a spiral track. These tracks may be inscribed partly or wholly with information. Alternatively they may be largely blank tracks in which a user can record the desired information. During information recording these blank tracks are used as servo tracks in order to ensure that a write radiation spot accurately follows a specific path. A centering error is to be understood to mean the deviation, in two directions, between the center of the concentric tracks or the spiral track and the axis of rotation of the turntable supporting the record carrier.

Optical record carriers in the form of a disc containing, for example, a video program or an audio program and which are known as "Laservision Disc" and "Compact Disc" ("CD"), respectively, and apparatus for reading these record carriers have been described frequently and comprehensively. By way of example reference is made to "Philips Technical Review", Vol. 33, No. 7, pages 178–193 and Vol. 40, No. 6, pages 149–155. An optical record carrier in which a user can record the desired information is described in: "IEEE Spectrum", August 1979, pages 26–33.

All the known ready-for-use record carriers have a center hold which engages a spindle when the record carrier is loaded into a write or read apparatus, so that the record carrier is fixed onto the spindle and is rotated by it. The center of the hole should very accurately coincide with the center of the circular tracks or the spiral track and the diameter of this hole should be equal to the diameter of the spindle with a very high accuracy in order to ensure that during rotation the tracks do not move eccentrically or, in other words, do not wobble relative to the scanning unit. The read and write apparatus comprise a tracking system by means of which a deviation between the center of the scanning spot and the center line of a track being scanned can be detected and eliminated. This tracking system is intended to correct comparatively small tracking errors which arise as a result of vibrations in the read or write apparatus, as a result of small deviations in the track spacings etc. The tracking system can also correct for tracking errors caused by a centering error but this is possible only to a limited extent, for example up to centering errors of the order of 100 $\mu$m. However, in practice the known record carriers may exhibit larger centering errors as a result of manufacturing tolerances. For example, the position of the center of the hole relative to the center of the track structure is subject to specific tolerances and the hole may exhibit out-of-roundness. Moreover, in case of frequent use, the hole may be subjected to wear, so that the record carrier is not tightly mounted on the spindle. For these reasons it is necessary to have a device for detecting and correcting such errors during reading and/or recording.

The need for accurate centering becomes even greater for novel uses of the disc, for example when used for storing magnetically and/or electronically, as well as optically, reproducible in addition to information, particularly if the disc is not provided with a hole.

In the case of the known record carriers such as the "Compact Disc" the "Laservision Disc" and the digital optical disc of the direct-recording type referred to as "D.O.R." disc, it may be advantageous if the record carrier need not be formed with a hole. This is not only because it is difficult to form the hole exactly at the desired location, but also because stresses may be produced in the record-carrier material when this hole is formed. Such stresses may give rise to changes in the optical properties of the material, which may impair correct read-out or recording of the information.

In a customary record carrier of the direct-recording type, the information layer is enclosed in an airtight manner between the substrate in which the information structure is formed and a disc which is spaced from the back of the substrate by an interposed spacer. If this record carrier is formed with a hole, the hole should also be sealed, which is a difficult task.

If the known audio or video record carriers are to be constructed as double sided discs, i.e. record carriers having two reflecting information layers arranged back-to-back, forming a centre hole becomes even more difficult because this hole must be centered relative to the two track structures. In particular for a record carrier having two information layers and for the above-mentioned direct-recording type record carrier, it is very advantageous if the record carrier is constructed without a hole.

When the known audio or video record carriers with center holes are manufactured, the holes are generally formed after the track structure has been formed. It is then necessary to ascertain where the center of the track structure is located, so that the hole forming tool can be centered relative to this center. U.S. Pat. No. 3,915,576 describes an apparatus for this purpose. In this apparatus the entire record carrier is illuminated with a broad beam and the radiation originating from the record carrier is received by a single detector arranged behind a diaphram having a small aperture. This detector receives only radiation originating from the track structure. The radiation originating from the trackless central portion of the information layer is stopped by an absorbing plate. The record carrier is positioned in such a way that a maximum amount of radiation is incident on the detector. The center of the track structure is then situated on the line connecting the radiation source to the detector. In the apparatus described in U.S. Pat. No. 3,915,576 the detector signal must be compared with a reference value. Moreover, it is possible to ascertain only whether the center of the track structure is situated in line with the radiation source and the detector and it is not possible to determine the sign of a centering error. In order to determine this sign additional steps are necessary, which are not described in the U.S. Pat. No. 3,915,576 patent.

It is the object of the present invention to provide an improved centering-error detection device by means of which both the magnitude and the sign of the centering error can be determined. The device in accordance with the invention is characterized in that the radiation source produces a radiation beam whose cross-section at the location of the information structure and transverse to the local track direction is of the order of at least a few times and up to several thousands of times the period of the track structure. The radiation-senstive detection system of the device comprises two detectors and is arranged in the path of a first-order diffraction beam which is formed as a result of the radiation beam being diffracted transversely of the local track direction by the information structure. The difference between the output signals of these detectors represents the centering-error signal.

Since the track structure is scanned with a spot whose diameter is equal to at least a plurality of track periods, this structure will behave as a diffraction grating which splits the incident radiation beam into different diffraction orders. The invention is based on the recognition of the fact that when the track structure is moved relative to the radiation spot, the track direction at the location of this spot changes and consequently the direction of the various diffraction orders changes. This change of direction can be detected by means of two detectors whose separating line extends substantially transversely of the direction in which one of the diffracted beams moves in the case of a displacement of the track structure. For this purpose one of the first-order beams is selected because it has the highest intensity. The detector signals are compared with each other and not with a reference value, and this comparison directly yields both the magnitude and the sign of a centering error in one direction.

The device in accordance with the invention can be made from simple and cheap elements and is therefore very suitable for use in apparatus for reading and inscribing the record carrier, which apparatus are intended as consumer products. The device may then be employed both for positioning a record carrier with or without the center hole on the turntable prior to scanning and for checking whether the track structure keeps rotating about the center during scanning. The device may also be employed in the manufacture of a record carrier having a center hole in order to ensure that this hole is formed at the correct location.

Another advantage of the device in accordance with the invention is that the positions of the detectors and the radiation source are not critical. Although an optimum centering-error signal is obtained by means of a device which is characterized further in that the separating line between the detectors is situated in the plane containing the center of the radiation source and the axis of rotation, a suitable centering error signal may also be obtained in the case of considerable deviations from these optimum positions.

In order to enable a deviation between the center of the track structure and the axis of rotation in two different directions to be detected, a preferred embodiment is characterized further by a second radiation source and a second radiation-sensitive detection system comprising two detectors. The second radiation-sensitive detection system is arranged in the path of the first-order diffraction beam which is formed as a result of the radiation beam emitted by the second radiation source being diffracted transversely of the track direction by the information structure.

For obtaining an optimum centering-error signal this device is preferably characterized further in that the center of the second radiation source, the axis of rotation and the separating line between the two detectors of the second radiation-sensitive detection system are situated in a second plane which extends at an angle to the first plane containing the center of the first radiation source, the axis of rotation and the separating line between the detectors of the first radiation-sensitive detection system.

It is to be noted that, in order to form a hole in an optical record carrier, it is known from German Offenlegungsschrift No. 3,300,208, which has been laid open to public inspection, to determine the location of the center of the track structure of a record carrier by means of at least three elongate radiation spots each associated with a separate single detector. In the device in accordance with German Offenlegungsschrift No. 3,300,208, however, the radiation spots are projected on the transition between the track structure and the trackless center portion of the record carrier and not on the track structure itself. The intensity of each beam originating from the record carrier is then measured with a single detector, which intensity is dictated by the radial position of the associated radiation spot relative to said transition. Moreover, the radiation spots are moved periodically in a direction transverse to said transition. The size of the radiation spots is not specified and, moreover, there is no mention of first-order diffraction beams.

Preferably, a device in accordance with the invention employing two radiation beams is characterized further in that the angle between the first plane and the second plane is approximately 90°. The centering error can then be resolved into two components along two orthogonal axes of a coordinate system whose origin coincides with the axis of rotation. These error components are then independent of one another and can be eliminated separately and consecutively.

In order to obtain a maximum sensitivity, the centering error detection device is characterized further in that the radiation spots formed on the information surface by the radiation beams are situated close to the center of the track structure. The tracks which are situated nearest the center have the largest curvature and, in the case of a displacement relative to the radiation spots, they produce the largest change in direction of the grating relative to these spots and consequently the largest displacement of the diffracted beams over the detectors.

Such a device may be characterized further in that a first detection system and a second detection system are combined to form a detection system comprising four detectors situated in different quadrants around the axis of rotation. The two radiation sources are situated off the axis of rotation at such locations that the radiation spots formed on the detectors by the corresponding diffracted first-order beams are superimposed when the center of the track structure coincides with the axis of rotation.

In order to obtain full information about a centering error in the case of a record carrier having a spiral track structure whose spiral extends substantially up to the center, it is not necessary to use two radiation sources and two detector pairs. In such a case all the centering information can be obtained by one radiation source and one radiation-sensitive detection system if of the: the radiation spot on the record carrier, the record carrier, or the detection system, performs a periodic movement relative to the other of those three elements. The magnitude of the detector signals relative to one another is then representative of the magnitude of the centering error, while the sign of the centering error is obtained by comparing the phase of the detector difference signals with the phase of the periodic movement.

In a first embodiment, the device with one radiation source and one radiation-sensitive detection system is characterized further in that the radiation spot is moved periodically over the record carrier along two orthogonal directions and in that the detection system comprises four detectors which are situated in different quadrants around the axis of rotation.

In a second embodiment, the device with one radiation source and one radiation-sensitive detection system is characterized further in that the radiation spot is moved periodically over the record carrier along two directions at different frequencies and in that the detection system comprises one detector.

Preferably, the device is characterized further in that each radiation source comprises a light-emitting diode followed by a lens, which assembly produces a substantially parallel beam, and in that each detector comprises a phototransistor. A very satisfactory signal can be generated using these inexpensive elements.

In accordance with a further characteristic feature of the device, a radiation source and an associated radiation-sensitive detection system are arranged on a common support.

The invention is embodied not only in a centering-error detection device but also in an apparatus for scanning an optical record carrier having an information surface provided with a circular track-shaped information structure. Such an apparatus comprises an optical scanning unit producing a scanning beam and a turntable for rotating the record carrier relative to the scanning unit. This apparatus comprises a detector system whose output signals are applied to the inputs of a control circuit for positioning means which cooperate with the record carrier to position the center of the track structure relative to the axis of rotation of the turntable.

Scanning by means of a radiation beam is to be understood to mean both scanning for the purpose of reading a prerecorded record carrier and scanning for the purpose of making a recording on a record carrier having a preformed servotrack structure.

An apparatus for reading a prerecorded record carrier is characterized further in that the scanning unit emits a read beam and comprises a radiation-sensitive detection system for converting the radiation modulated by the information structure coming from the record carrier into an electrical signal which is representative of the information being read and into an electrical signal for the purpose of tracking and/or focussing.

An apparatus for recording information in a layer on the surface of a record carrier, which layer is provided with preformed optically detectable servo tracks, is characterized further in that the scanning unit comprises a modulator for modulating the intensity of the radiation beam in conformity with the information to be recorded and a radiation-sensitive detection system for converting the radiation coming from the information surface into an electrical signal for the purpose of tracking and/or focussing.

The invention may be used in the manufacture of record carriers to position the track structure exactly relative to a tool by means of which a hole is formed in the record carrier and also in conjunction with ready-to-use record carriers with a center hole to realize a kind of coarse tracking method. In addition, the invention enables a novel type of record carrier to be put to practical use. Such a record carrier forms another aspect of the present invention and is characterized in that the information layer is an uninterrupted layer which extends up to the center of the track-shaped information structure.

Such a novel record carrier may occur in various embodiments. A first embodiment is characterized in that the track-shaped structure extends substantially up to the center of the record carrier with the tracks near the center containing no information.

The tracks in the direct vicinity of the center do not contain information because at a constant scanning speed, the information areas in these tracks would be too short. On the other hand, in the case of a constant average length of the information areas, the scanning speed or speed of rotation of the record carrier would be too high. The informationless portion of the track structure near the center, however, may be employed for the purpose of centering-error detection.

The record carrier of the invention may be characterized further in that tracks which are situated outside the direct vicinity of the center are filled with information. This record carrier, which is of the read-only type, contains, for example, an audio program or a video program.

The record carrier of the invention may also be adapted to be inscribed by a user and is then characterized further in that the information layer is provided with preformed optically detectable tracks provided with sector addresses which contain the addresses of the associated blank track portions provided with an optical recording medium.

Both the prerecorded and the direct-recording record carrier may be provided with a second information layer. Both information layers are radiation-reflecting and face one another with their non-reflecting sides.

Figure 4:
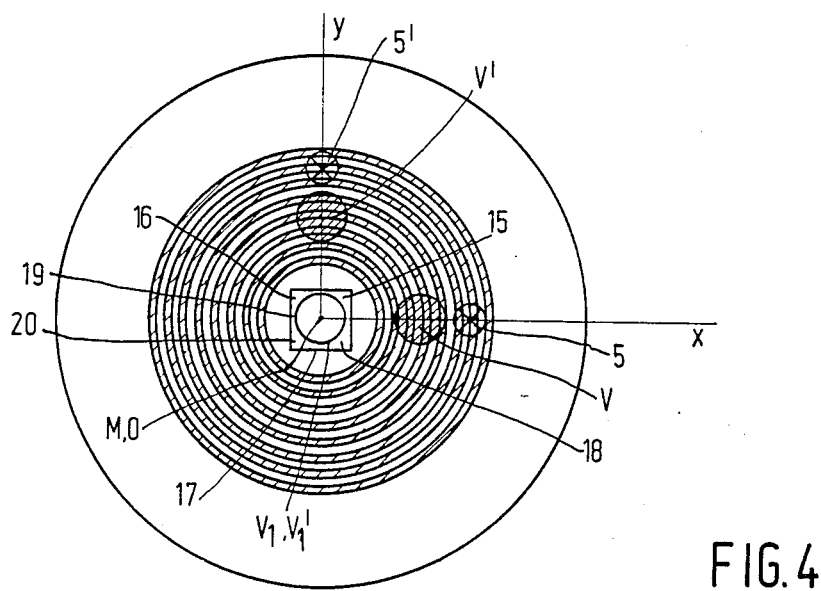
Figure 5:
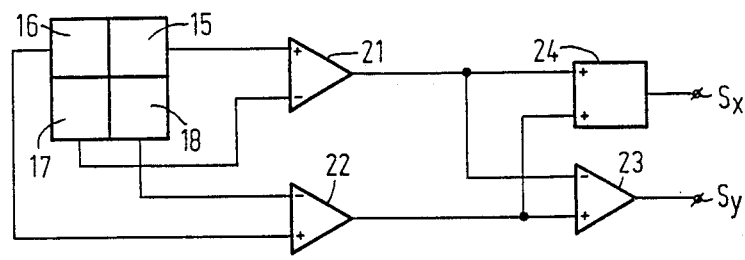
Figure 6:
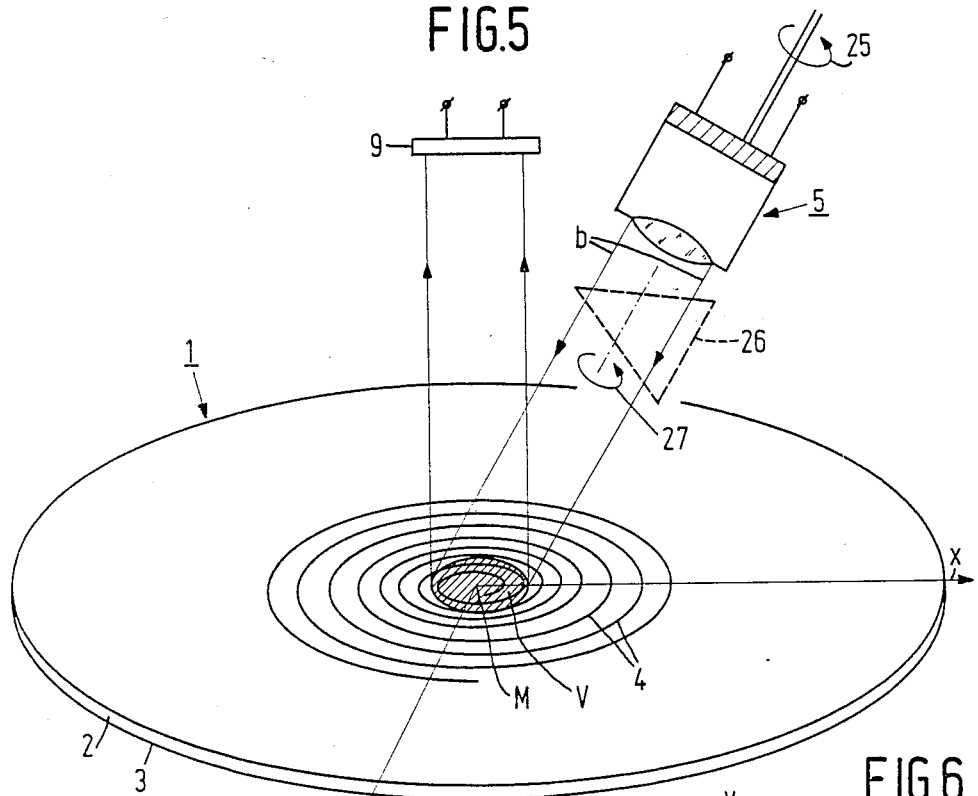
Figure 7:
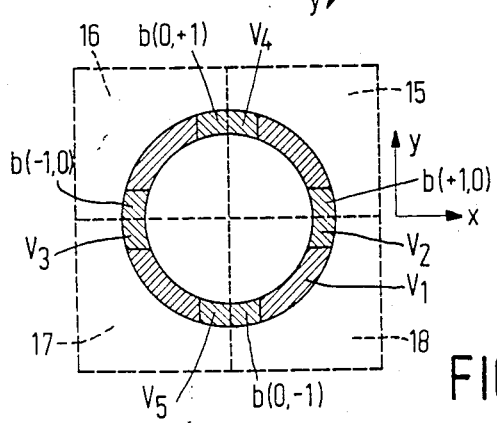

The invention will now be described in more detail, by way of example, with reference to the accompanying drawings. In the drawings:

FIG. 1 illustrates the principle of the device in accordance with the invention, FIGS. 2a to 2f show different directions of the tracks relative to the radiation spot formed on these tracks and the corresponding positions of the image of this radiation spot formed on the detectors, FIG. 3 shows a device in an embodiment comprising two radiation sources and two radiation-sensitive detection systems, FIG. 4 shows a device in an embodiment comprising two radiation sources and one four-quadrant detector, FIG. 5 shows an example of an electronic circuit for processing the signals supplied by this device, FIG. 6 shows a device in an embodiment comprising one radiation source and one radiation-sensitive detection system, FIG. 7 shows the shape of the radiation spot formed on the detectors in said device.

Figure 8:
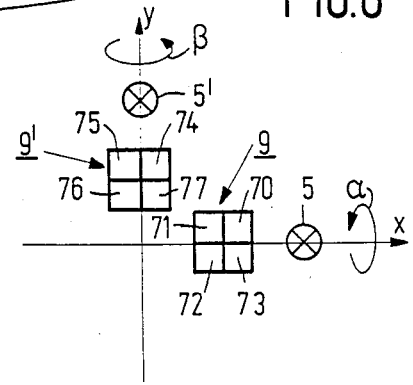
Figure 9:
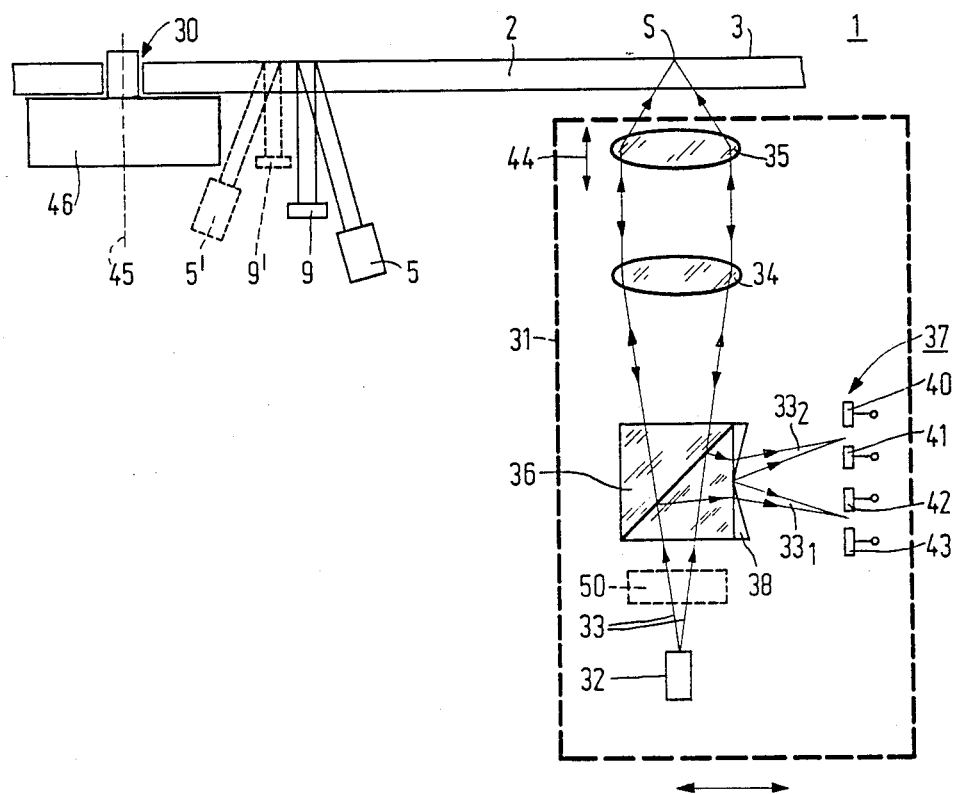
Figure 10:
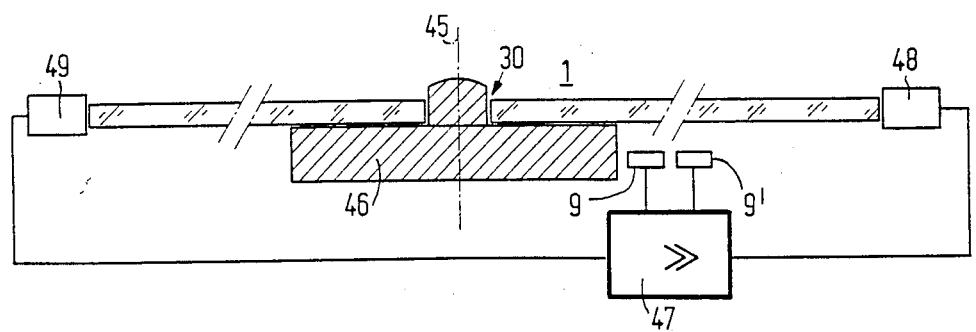
Figure 11:
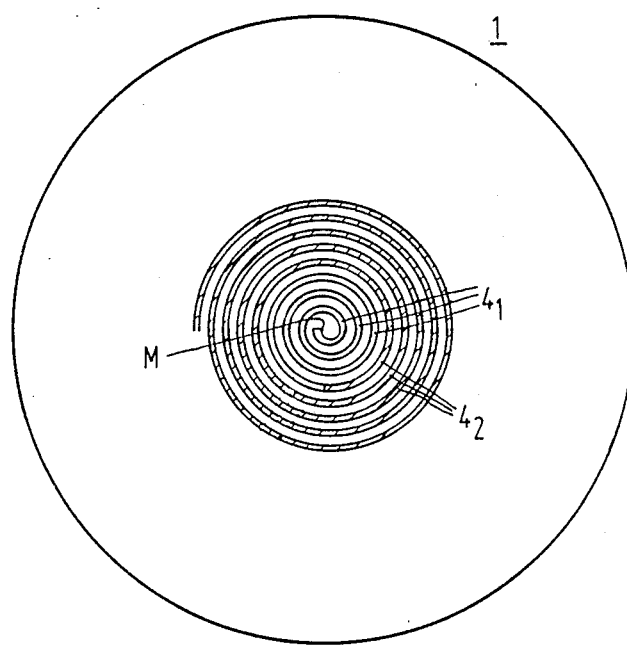
Figure 12:
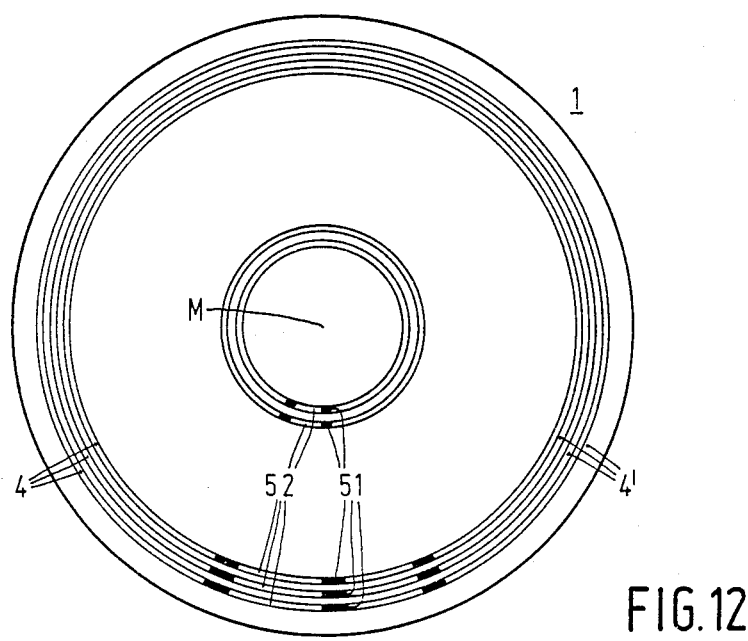
Figure 13:
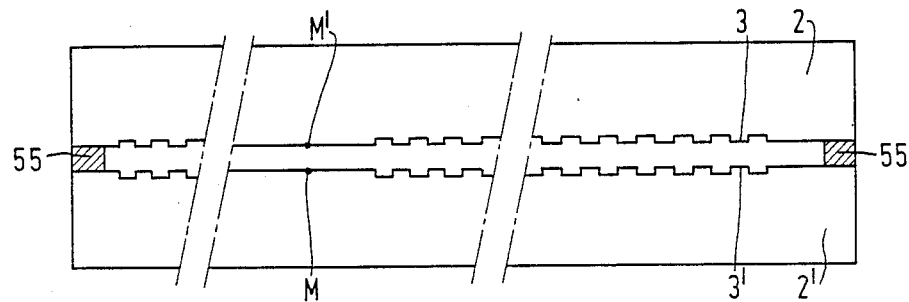
Figure 14:
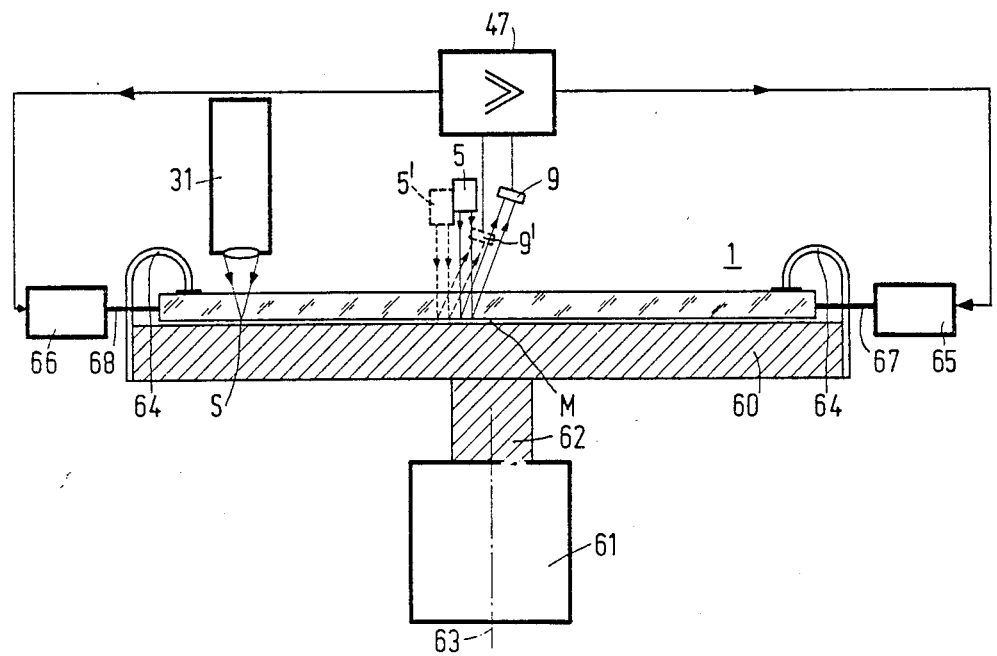

FIG. 8 shows a device in an embodiment which also enables tilting errors of the record carrier to be measured, FIG. 9 shows an apparatus for reading and/or inscribing a record carrier, provided with said device, FIG. 10 shows a device in an embodiment comprising means for positioning the record carrier relative to the turntable, FIG. 11 shows a record carrier without centre hole in accordance with the invention in a first embodiment, FIG. 12 shows such a record carrier in a second embodiment, FIG. 13 shows such a record carrier in a third embodiment, and FIG. 14 shows an apparatus for recording and/or inscribing the novel record carrier.

FIG. 1 shows a record carrier 1 having an information surface 3. This surface is, for example, radiation-reflecting and is formed on a transparent substrate 2. The information surface is formed with a multitude of concentric or quasi-concentric tracks 4 which have been or can be provided with information. Only a few of this multitude of tracks are shown at an enlarged scale. The center of the track structure is identified by the reference character M. The device to be described hereinafter serves for determining the position of the center M relative to a desired position in an apparatus intended for use in conjunction with the record carrier. The desired position can be defined by the origin O of an XYZ coordinate system. This origin O coincides, for example, with the axis of rotation of a turntable, not shown, in the apparatus, which turntable supports the record carrier.

The device comprises a radiation source 5 which emits a radiation b, for example a parallel beam. The radiation source may comprise a light-emitting diode 7 and a lens 8 accommodated in a common housing. Such a composite radiation source is commercially available at low cost. The beam b is projected on the information layer onto an area V of a diameter from a few times up to several thousands of times the period of the track structure. This structure then behaves as a diffraction grating which splits the incident beam b into a zero-order subbeam, two first-order subbeams $b(=1)$, $b(-1)$, and a plurality of higher-order subbeams. Only one of the first-order subbeams is utilized because these beams have the highest radiation intensity on account of the geometry of the track structure, said geometry being optimized for the purpose of reading. In the case of perpendicular incidence of the beam b on the information surface, as is assumed in FIG. 1, the zero-order subbeam is reflected perpendicularly so that this beam has the same direction as the beam b. The first-order and higher-order subbeams are diffracted through specific angles. If the chief ray of the incident beam extends perpendicularly to the local track direction, i.e. the direction of the tracks at the location of the radiation spot V, the chief rays of all the diffracted beams are situated in a plane transverse to the local track direction. A radiation-sensitive detection system 9 comprising two radiation-sensitive detectors 10 and 11 is arranged in the path of the first-order subbeam $b(-1)$. The reflected beam $b(-1)$ forms a radiation spot $V_1$ on this detection system. Suitably, the detectors 10 and 11 are positioned in such a way that their separating line is disposed in the plane through the center of the radiation source 5 and the Z-axis, i.e. the XZ-plane in FIG. 1. In the drawing the detectors are slightly tilted about the X-axis for the sake of clarity. The detector 10 is situated in front of the XZ-plane and the detector 11 is situated behind this plane.

FIG. 1 illustrates the situation in which the center M of the track structure, viewed in the Y-direction, occupies the correct position, i.e. is situated on the X-axis. At the location of the radiation spot V, the tracks then extend in the Y-direction, as shown in FIG. 2a. The the chief ray of the beam $b(-1)$ is then in the XZ-plane so that the radiation spot $V_1$ is situated symmetrically relative to the detectors 10 and 11, as is shown in FIG. 2d. The output signals $S_{10}$ and $S_{11}$ of the detectors are then equal and the difference signal $S_y = S_{10} - S_{11}$, representing the positional error in the Y-direction, is then zero.

If the entire record carrier and consequently its center M is shifted in the Y-direction, for example backward, the tracks at the location of the radiation spot have another direction, namely the direction indicated in FIG. 2b. The direction of the chief ray of the beam $b(-1)$ is then no longer situated in the XZ-plane but behind that plane, so that a larger part of the spot $V_1$ is situated on the detector 11 and a smaller part is situated on the detector 10, as shown in FIG. 2e. The signal $S_y = S_{10} - S_{11}$ is then negative.

If the record carrier is shifted forward in the Y-direction, the tracks at the location of the radiation spot V will have the direction indicated in FIG. 2c and the chief ray of the beam $b(-1)$ will be situated in front of the XZ-plane. The larger part of the radiation spot $V_1$ is now incident on the detector 10, as shown in FIG. 2f. The signal $S_y$ is then positive.

Thus, the signal $S_y$ contains information about the magnitude and the sign of a positional error of the center M along the Y-axis.

Similarly, by means of a second radiation source 5' and a second detection system 9', the separating line between the detectors of this system and the center of the radiation source being suitably disposed in the YZ-plane, it is possible to generate a signal $S_x$ which represents the magnitude and the sign of the positional error of the center M in the X-direction relative to the origin O of the coordinate system XYZ. For the sake of simplicity FIG. 1 only shows the radiation spot V' which is formed on the record carrier by the second radiation source. The second radiation source 5' and the second detection system 9' comprising the detectors 10' and 11' are shown schematically in FIG. 3. This Figure is a plan view of the radiation sources, the detection systems, and the record carrier.

The arrangement shown in FIG. 3 is the most suitable arrangement. In this arrangement the plane containing the center of the radiation source 5 and the separating lines of the detectors 10 and 11, which plane is represented by the X-axis in FIG. 3, extends perpendicularly to the lane containing the center of the radiation source 5' and the separating lines of the detectors 10' and 11', which plane is represented by the Y-axis in FIG. 3. Indeed, the signals $S_x$ and $S_y$ are then independent of each other and the positional errors of the center M in the X-direction and the Y-direction can be eliminated independently of each other and one after the other. However, alternatively, said planes may make angles smaller than 90° with each other. For eliminating the positional error or centering error the signals $S_x$ and $S_y$ should then be reduced to zero iteratively.

It is to be noted that the situation illustrated in FIGS. 1 and 3 is the ideal situation in which the center of the radiation source, 5 and 5' respectively, and the separating line of the detectors, 10, 11 and 10', 11' respectively, are disposed in line with a point of the axis of rotation Z. However, for larger deviations from this relative position, acceptable positional-error signals can also be obtained. For example, the separating line of the two detectors may be rotated outside the plane containing the center of the radiation source and the axis of rotation or the center of the detection system or the center of the radiation spot may be situated outside this plane.

Preferably, a radiation source and the associated detection system comprising two detectors are arranged on a common support, bearing the reference numeral 14 in FIG. 3. This support may be slightly curved. During assembly of the device, comprising one or two such common supports, adjustment is comparatively simple. A reference record carrier whose tract-structure center is positioned accurately relative to the axis of rotation is then mounted in the device. Subsequently, the common support carrying the radiation source and the two detectors is adjusted to roughly the desired position and tilted in such a way that the difference between the signals from the detectors is zero. The alignment of the radiation source and the detectors relative to one another is then correct.

Suitably, the radiation spots are positioned on the inner tracks. Since these tracks have the largest radius of curvature a displacement of the record carrier will give rise to the largest change in track direction at the location of the radiation spots V and V' and consequently the largest shift of the spots $V_1$ and $V'_1$ over the associated detectors. This results in a maximum sensitivity of the device.

For these positions of the radiation spots V and V', it is alternatively possible to use a combined detection system, as shown in FIG. 4, instead of two separate detection systems. The combined detection system comprises four detectors 15, 16, 17 and 18 which are disposed in four different quadrants around the axis of rotation through the point O. The separating lines 19 and 20 between the detectors preferably extend in the X-direction and the Y-direction respectively. The positional error signals in the X-direction and the Y-direction respectively are now given by:

$$S_x = (S_{15} + S_{16}) - (S_{17} + S_{18})$$

$$S_y = (S_{16} + S_{17}) - (S_{15} + S_{18})$$

The signals $S_x$ and $S_y$ can be derived by means of a simple electronic circuit, an example of which is shown in FIG. 5. This circuit comprises three different amplifiers 21, 22 and 23 and a summing device 24. The circuit generates the signals $$(S_{15} - S_{17}) + (S_{16} - S_{18}) = S_x$$

and $$(S_{16} - S_{18}) - (S_{15} - S_{17}) = S_y$$

FIG. 6 shows the device in accordance with the invention in another embodiment. This device is suitable for determining the position of the center M of a spiral track which extends almost up to center. The single radiation spot V is now incident on the central portion of the track structure and the first-order radiation beam which has been diffracted by the track structure is now incident on one radiation-sensitive detection system.

The radiation spot $V_1$ formed in the plane of the detection system is now annular if the track-shaped information structure is centered correctly. This annular shape is shown in FIG. 7. If the center of the track structure is shifted in the X-direction, the annulus contracts to form two radiation spots $V_2$ and $V_3$. If the track structure is shifted in the Y-direction the annular changes into two radition spots $V_4$ and $V_5$. The first order diffraction beams forming the spots $V_2$, $V_3$, $V_4$ and $V_5$ are indicated by $b(+1,0)$, $b(-1,0)$, $B(0,+1)$ and $B(0,-1)$, respectively in FIG. 7. The detection system comprises, for example, four detectors 15, 16, 17 and 18 which are arranged in four different quadrants around the axis of rotation. By comparing the output signals of these detectors it is possible to determine the magnitude of the centering error in the X-direction and the Y-direction.

In order to determine not only the magnitude but also the sign of the deviation between the actual position and the desired position of the center of the track-shaped structure, the radiation spot V is moved periodically, for example in the X- and Y-direction, and the phases of the difference signals from the detectors are compared with the phases of the movements of the spot in the directions corresponding to said detectors. The oscillations of the spot in the X-direction and the Y-direction may have the same frequency. If the radiation spot V is oscillated at two different frequencies the directions in which the spot V is oscillated need not be perpendicular to each other. The detection system then need not comprise four detectors and it is possible to employ a single central detector arranged at the location of the four-quadrant detector 15, 16, 17, 18. The periodic movements of the radiation spot V can be realised in various manners. For example, the radiation source 5 itself can be rotated about an eccentric axis 25. It is alternatively possible to arrange a radiation-transmitting plane-parallel plate in the radiation path from the radiation source to the record carrier, which plate is tilted periodically about two axes, or to provide a radiation-transmitting wedge 26 which rotates about an axis 27 or a mirror which rotates about an eccentric axis. Further, it is possible to move the detectors or the record carrier periodically instead of the radiation spot V.

An advantage of the device in accordance with the invention is that the resulting signals are insensitive to the variation in the period of the track structure. A radiation spot V is used which covers a plurality of tracks and variation in the track period can cause the radiation spot $V_1$, $V_1'$ to be shifted over the detectors only in the direction of the separating lines between the detectors. A possible variation in the wavelength of the radiation used can only give rise to a shift of the radiation spot $V_1$, $V_1'$ in the direction of these separating lines, so that the device is also insensitive to this variation.

For an accurate measurement by means of the device, the record carrier should be perfectly flat and not tilted or such that such a tilt can be detected to enable it to be compensated for. Tilting of the record carrier gives rise to a shift of radiation spot $V_1$, $V_1'$ in a direction transverse to the direction in which this radiation spot moves upon a displacement of the center M. Therefore, a tilt can be measured if the two detectors 10, 11 and 10', 11' in the device shown in FIG. 3 are replaced by four detectors 70, 71, 72, 73 and 74, 75, 76, 77 respectively, as is shown in FIG. 8. The centering-error signals are given by:

$$S_x = (S_{74} + S_{77}) - (S_{76} + S_{75})$$

$S_y = (S_{70} + S_{71}) - (S_{72} + S_{73})$ ps and the signals representing the tilt about the X-axis ($S_\alpha$) and the tilt about the Y-axis ($S_\beta$) respectively are given by:

$$S_\alpha = (S_{70} + S_{73}) - (S_{71} - S_{72})$$

$$S_\beta = (S_{74} - S_{75}) - (S_{76} - S_{77})$$

The degree of tilting can also be determined by means of a separate radiation source, for example a light-emitting diode, and a separate radiation-sensitive detection system which is arranged in the path of the zero-order beam issuing from the record carrier.

FIG. 9 shows an apparatus for reading an optical record carrier 1 with a center hole 30. This apparatus is equipped with a read unit 31 which comprises, in this order, a radiation source 32, for example a diode laser, a collimator lens 34, and an objective 35 which focusses the read beam 33 on the information surface 3 to form a small radiation spot S having dimensions of the order of magnitude of the information details to be read. The read beam reflected by surface 3 is separated from the projected beams by a beam splitter, for example a separating prism, 36 and is diverted to a radiation-sensitive detection system 37 which converts the modulated read beam into, inter alia, a signal representing the information being read.

In order to detect a focussing error of the read beam relative to the information surface 3, a wedge 38 splits the reflected beam into two subbeams and the detection system 37 comprises four detectors 40, 41, 42 and 43. As is known from inter alia U.S. Pat. No. 4,489,408, the focussing-error signal $S_f$ is given by:

$$S_f = (S_{40} + S_{43}) - (S_{41} + S_{42})$$

where $S_{40}$, $S_{41}$, $S_{42}$ and $S_{43}$ are the output signals of the detectors 40, 41, 42, and 43. This signal enables, for example, the axial position of the objective 35 to be controlled, as is indicted by the arrow 44 in FIG. 7.

The information signal $S_I$ is then:

$$S_I = S_{40} + S_{41} + S_{42} + S_{43}.$$

By means of these four detectors it is also possible to derive a tracking signal $S_r$, i.e. a signal which is indicative of a deviation between a center of the read spot S and the central axis of the track to be scanned. This signal, which is represented by:

$$S_r = (S_{40} + S_{41}) - (S_{42} + S_{43}),$$

is used for controlling the radial position of the read spot S, for example by moving the objective 35 or the entire read unit 31 in a radial direction.

In order to detect, whether the centre M of the track structure coincides with the axis of rotation 45 of a turntable 46, the apparatus is equipped with a device as described above. The device comprises two radiation sources 5 and 5' and two detection systems 9 and 9' arranged as shown in FIGS. 1 and 3. In the apparatus shown in FIG. 9, the radiation source 5 and the detection system 9 are situated, for example, in front of the plane of the drawing and the radiation source 5' and the detection system 9' are situated behind that plane. The signals from the detection systems 9 and 9' may be applied to a differential amplifier which drives, for example, four actuators which act on the edge of the record carrier 1, as is shown in FIG. 10. In this Figure only two of these actuators 48 and 49 are shown schematically. The two other actuators are situated in front of and behind the plane of the drawing of FIG. 10. The actuators may be, for example, electromechanical or piezoelectric elements.

After the record carrier has been positioned on the turntable in such a way that the center of the track structure coincides with the axis of rotation 45, it is fixed on the turntable in that position by known means such as mechanical clamping means, electromagnetic clamping means, a pressure member or a partial vacuum between the turntable and the record carrier. The turntable with the record carrier can then be set into rotation and reading may begin.

As the record carrier rotates, the device for detecting a centering error may remain operative to ascertain whether the centering of the track structure relative to the axis of rotation is maintained.

The device in accordance with the invention may also be used in a recording apparatus. In principle this apparatus may be of the same construction as the read apparatus shown in FIG. 9 with an additional element, namely a modular (50 in FIG. 9) by means of which in conformity with the information to be written, the intensity of the scanning beam is switched between a high level sufficient to locally produce an optically detectable change in the information layer and a lower level which does not give rise to such a change. The lower level may be, for example, sufficiently high to read information already present and to generate a tracking error and/or focussing-error signal. If the radiation source is a diode laser, the intensity of the laser beam can be switched directly by means of a pulsating electric current through the diode laser, so that a separate intensity modulator is not required.

The principal advantage of the device in accordance with the invention is obtained when the device is combined with an optical record carrier which does not have a center hole for cooperation with a spindle. Since the device is designed in such a way that it can be constructed from simple and inexpensive components, it is suitable for use in a low-cost mass-produced read or write apparatus. Since inexpensive players and/or recorders enable record carriers without center holes to be used for the first time on a large scale. Therefore, such novel record carriers fall within the scope of the present invention. Such record carriers are ready for use and should not be confused with the intermediate products obtained in the manufacture of the known record carriers which are not yet formed with a hole.

The record carrier of the invention has the following advantages:

stresses which arise in the material of the record carrier when a hole is formed will not occur, a difficult and expensive step in the manufacture process may be dispensed with, in principle a larger part of the information layer is available for information storage.

The record carrier in accordance with the invention is based on the recognition of the fact that to rotate the record carrier so as to scan the information surface it is not absolutely necessary to have a hole in the record carrier and a spindle on the turntable. The record carrier can also be retained on the turntable in other ways, provided that there are means for positioning the center of the track structure relative to the axis of rotation of the turntable with adequate accuracy.

FIG. 11 is a plan view of an embodiment of the novel record carrier. The center of the track structure again bears the reference M and the tracks themselves bear the reference numeral 4. The inner tracks $4_1$, situated within a radius of, for example, a few tenths of a millimeter do not contain information and comprise grooves or plane strips which optically differ from the intermediate lands $4_0$. Only the tracks $4_2$ which are situated at a larger distance from the centre are utilized for information storage. The tracks $4_2$ may be fully prerecorded. However, alternatively, as is shown in FIG. 12, the tracks $4_2$ may be largely empty and are only provided by the manufacturer with sector addresses 51 which contain inter alia the addresses of the associated recordable track portions 52. For further particulars on direct-recording record carriers reference is made to U.S. Pat. No. 4,363,116.

Particularly, if the described record carrier has a "sandwich" structure, i.e. a disc is arranged at some distance from the back of the information layer to provide air-tight sealing of the information layer together with the substrate, it is very advantageous if no center hole is to be formed because this may give rise to sealing problems at the location of the hole.

FIG. 13 is a radial cross-sectional view of a double sided version of the record carrier shown in FIG. 11. The information surfaces 3 and 3', respectively, with tracks 4 and 4', respectively, of the two record carriers 1 and 1', respectively, having transparent substrates 2 and 2', respectively, face each other with the information layers and are secured to one another with an interposed spacer 55. Since the assembled record carrier need not be formed with a center hole which has to be centered relative to both track structures, these two track structures need not be aligned very accurately relative to each other, which considerably simplifies the manufacture of this type of double sided record carrier.

The record carriers shown in FIGS. 11, 12 and 13 can be read and/or inscribed by means of the optical unit shown in FIG. 9. In FIG. 14, which shows an example of an apparatus for reading and/or recording information on the novel record carrier, the scanning unit is indicated by the reference numeral 31. The radiation spot S formed by unit 31 scans the information surface 3 of the record carrier 1. The record carrier is supported by a turntable 60 whose diameter is at least equal to that of the record carrier. A motor 61 drives the turntable via a spindle 62. The record carrier can be fixed in position on the turntable in various ways. For example, the turntable may be provided with resilient clamps 64 which cooperate with the edge of the record carrier. Another possibility is to provide the turntable with an electromagnet which cooperates with a magnetic layer on the record carrier. Yet another possibility is to provide the turntable with air ducts through which air between the record carrier and the turntable can be drawn off, so that a partial vacuum is obtained and the record carrier is drawn against the turntable.

Further, the apparatus comprises, for example, two additional radiation sources 5 and 5' and two radiation-sensitive detection systems 9 and 9' for detecting the position of the center M of the track structure relative to the axis of rotation 63 of the turntable. The signals from the detection systems 9 and 9' are applied to a control amplifier 47 which drives a number of, for example electromechanical or piezo-electric, actuators 65, 66. These actuators are connected to rods 67, 68 by means of which the record carrier can be moved relative to the turntable.

What is claimed is:

1. A device for determining the centering error of an information structure on an optical record carrier relative to the axis of rotation of a turntable supporting the record carrier, which information structure comprises a plurality of generally concentric, circular tracks, said device comprising at least one radiation source for projecting radiation onto the information structure and a radiation-sensitive detection system for converting radiation coming from the record carrier into an electrical signal which is indicative of the centering error, characterized in that the radiation source produces a radiation beam whose cross-section at the location of the information structure and transverse to the local track direction is between at least a few times and several thousands of times the period of the tracks and in that the radiation-sensitive detection system comprises at least two detectors arranged in the path of a first-order diffraction beam which is formed as a result of the radiation beam being diffracted transversely of the local track direction by the information structure, and means for producing, from output signals of said at least two detectors, said electrical signal indicative of the centering error.

2. A device as claimed in claim 1, characterized in that the separating line between the detectors is situated in the plane containing the center of the radiation source and the axis of rotation.

3. A device as claimed in claim 2, characterized by a second radiation source and a second radiation-sensitive detection system comprising two detectors, the second radiation-sensitive detection system being arranged in the path of the first-order diffraction beam which is formed as a result of the radiation beam emitted by the second radiation source being diffracted transversely of the track direction by the information structure.

4. A device as claimed in claim 3, characterized in that the center of the second radiation source, the axis of rotation and the separating line between the two detectors of the second radiation-sensitive detection system are situated in a second plane which extends at an angle to the first plane containing the center of the first radiation source, the axis of rotation and the separating line between the detectors of the first radiation-sensitive detection system.

5. A device as claimed in claim 4, characterized in that the angle between the first plane and the second plane is approximately 90°.

6. A device as claimed in claim 3, 4 or 5, characterized in that the radiation spots formed on the information surfaces by the radiation beams are situated close to the center of the track structure.

7. A device as claimed in claim 6, characterized in that a first detection system and a second detection system are combined to form a detection system comprising four detectors situated in different quadrants around the axis of rotation.

8. A device as claimed in claim 1 or 2, wherein said tracks form a spiral which extends substantially up to the center of the information structure and wherein said device has one radiation source and one radiation-sensitive detection system, and further comprises means for periodically moving one of the elements of the group consisting of the radiation spot formed on the record carrier, the record carrier, and the detection system, relative to the other two elements of said group.

9. A device as claimed in claim 8, characterized in that the radiation spot is moved periodically over the record carrier along two orthogonal directions and in that the detection system comprises four detectors which are situated in different quadrants around the axis of rotation.

10. A device as claimed in claim 8, characterized in that the radiation spot is moved periodically over the record carrier along two directions at different frequencies and in that the detection system comprises one detector.

11. A device as claimed in claims 1, 2 or 3, characterized in that each radiation source comprises a light-emitting diode followed by a lens arranged to produce a substantially parallel beam.

12. A device as claimed in claim 1, characterized in that said radiation source and radiation-sensitive detection system are arranged on a common support.

13. An apparatus for scanning an optical record carrier having an information surface provided with an information structure comprised of a plurality of generally concentric, circular tracks, said apparatus comprising an optical scanning unit producing a scanning beam, a turntable for rotating the record carrier relative to the scanning unit, a centering device comprising at least one radiation source for projecting radiation onto said information structure and a radiation sensitive detection system for converting radiation coming from the record carrier into an electrical, centering signal which is indicative of the centering error of said optical structure relative to the axis of rotation of said turntable, the radiation source producing a radiation beam whose cross-section at the location of said information structure and transverses to the local track direction is between at least a few times and several thousands of times the period of the tracks, said radiation-sensitive detection system comprising at least two detectors arranged in the path of a first-order diffraction beam which is formed as a result of said radiation being diffracted transversely of the local track direction by said information structure, and means for producing, from output signals supplied by said at least two detectors, said centering signal, said apparatus further comprising positioning means for varying the position of said record carrier relative to said turntable, and a control circuit having an input for receiving said centering signal, said control circuit, in response to said centering signal, controlling said positioning means to position the record carrier so that said optical structure is centered with respect to the axis of rotation of said turntable.

14. An apparatus as claimed in claim 13 wherein said scanning beam produced by said scanning unit is a read beam of radiation and wherein said scanning unit comprises radiation-sensitive means for converting radiation of said read beam which comes from said record carrier and is modulated by the information structure into a first electrical signal which is representative of the information being read and into a second electrical signal for the purpose of tracking and/or focusing.

15. An apparatus as claimed in claim 13 wherein said information surface is provided with preformed, optically detectable servo tracks, said scanning beam is a beam of write radiation and said scanning unit comprises a modulator for modulating the intensity of said write beam in conformity with information to be recorded on said record carrier, and means for converting radiation coming from said information surface into a further electrical signal for the purpose of tracking and/or focusing.

* * * * *

UNITED STATES PATENT AND TRADEMARK OFFICE
CERTIFICATE OF CORRECTION

PATENT NO. : 4,761,776
DATED : August 2, 1988
INVENTOR(S) : Willem G. Opheij

It is certified that error appears in the above-identified patent and that said Letters Patent is hereby corrected as shown below:

<u>IN THE TITLE</u>

Change    "DEVICE FOR DETERMINING A CENTRING ERROR OF AN OPTICAL DISC RELATIVE TO THE AXIS OF ROTATION OF A TURNTABLE SUPPORTING THE DISC"

To    --DEVICE FOR DETERMINING A CENTERING ERROR OF AN OPTICAL DISC RELATIVE TO THE AXIS OF ROTATION OF A TURNTABLE SUPPORTING THE DISC--

Signed and Sealed this

Fourteenth Day of March, 1989

*Attest:*

DONALD J. QUIGG

*Attesting Officer*      *Commissioner of Patents and Trademarks*